United States Patent Office 3,315,579
Patented Apr. 25, 1967

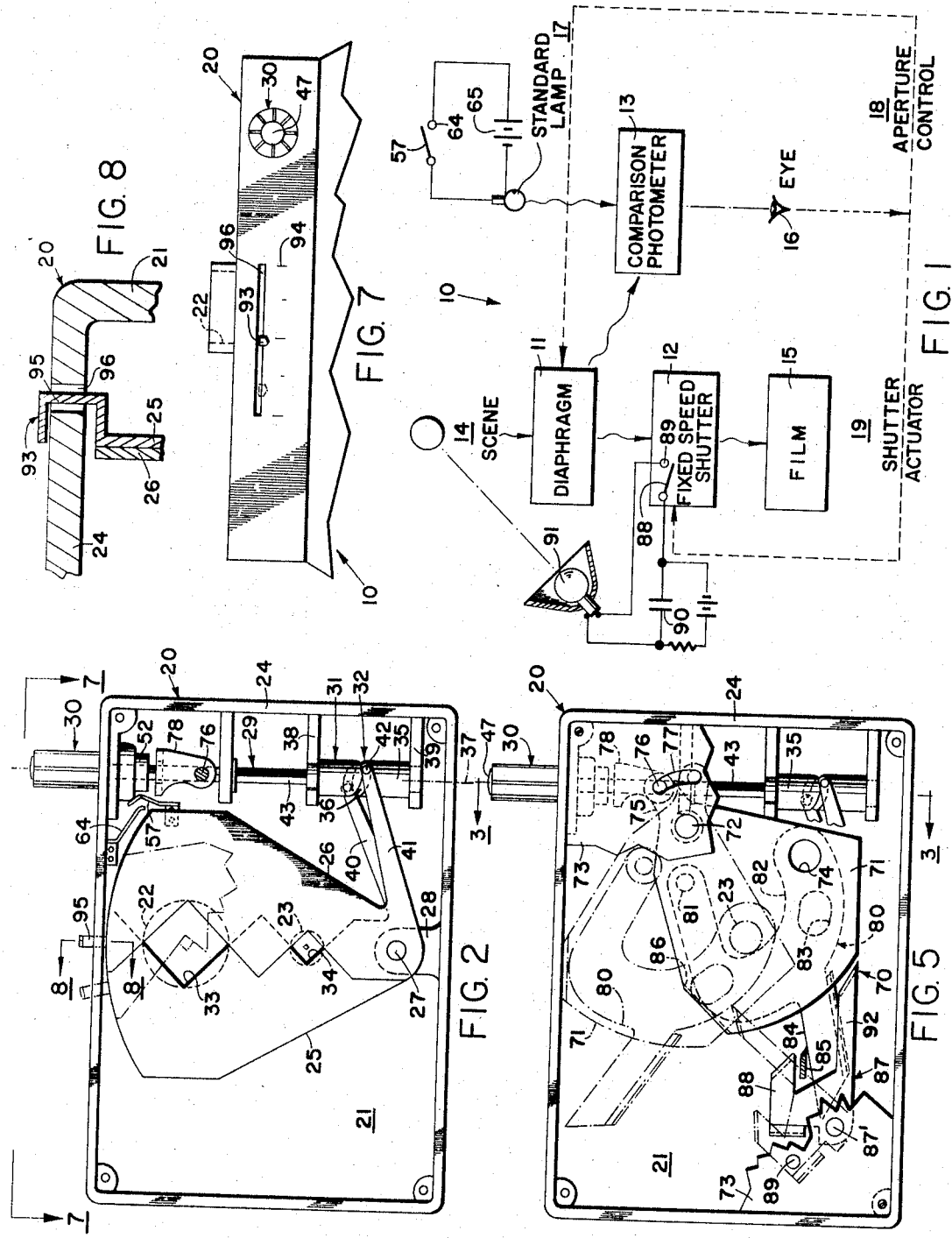

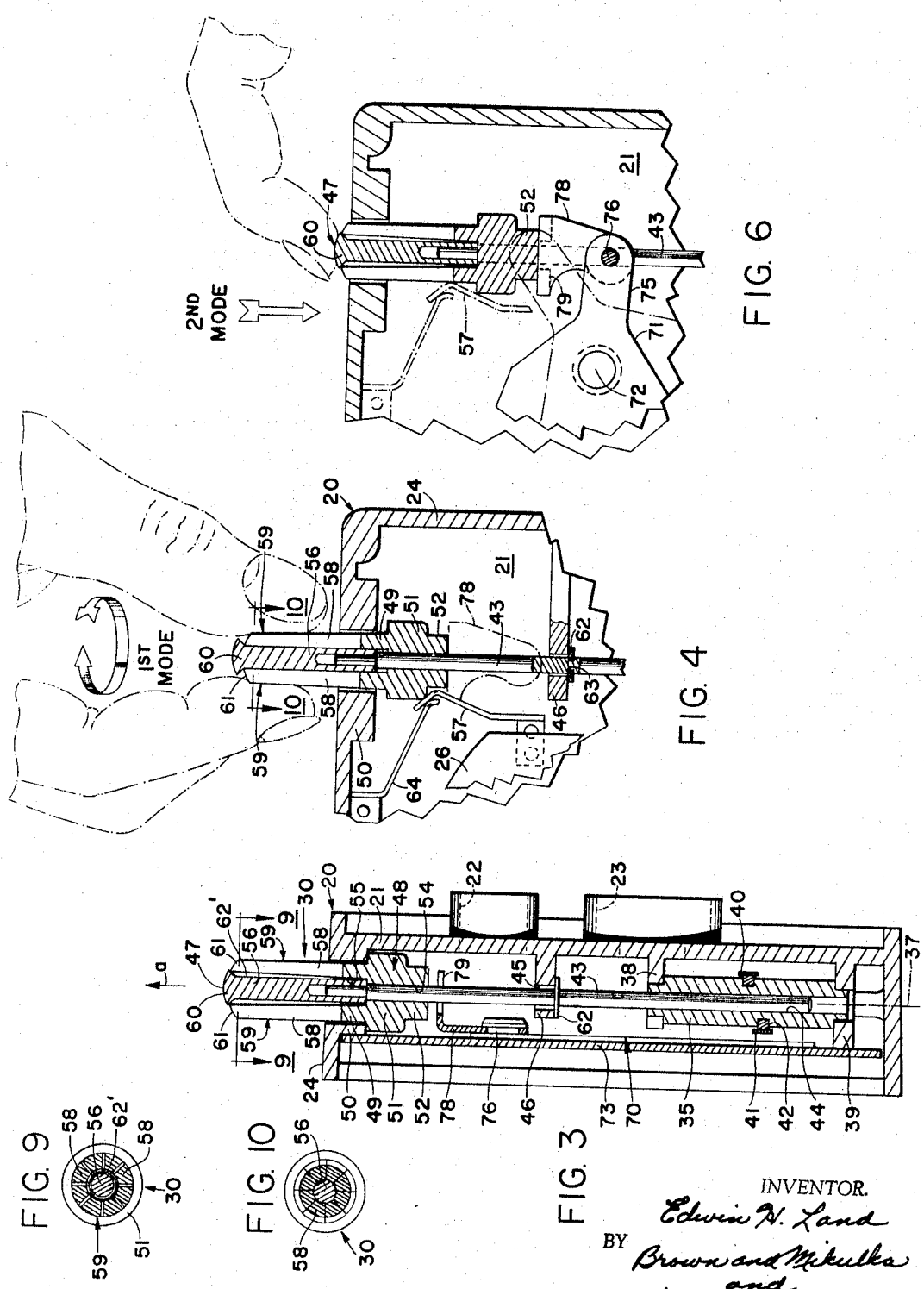

3,315,579
DUAL MODE CONTROL MEANS
Edwin H. Land, Cambridge, Mass., assignor to Polaroid Corporation, Cambridge, Mass., a corporation of Delaware
Filed Apr. 13, 1964, Ser. No. 359,114
19 Claims. (Cl. 95—10)

This invention relates to cameras which utilize the balancing of a comparison photometer to synchronously establish the correct exposure value of the shutter mechanism.

In order to simplify construction of this type camera, a fixed speed shutter mechanism is frequently employed, with the exposure value of the mechanism being determined by an adjustable diaphragm contoured to provide an exposure aperture whose area depends upon the position of the diaphragm. Construction is further simplified when the balancing of the comparison photometer is accomplished by attenuating light from the scene being photographed until photometric balance is achieved with a source of known and fixed intensity. With this mode of operation, the diaphragm can be contoured to define a photometer aperture, in addition to the exposure aperture, such that adjustment of the diaphragm to achieve photometric balance synchronously increases or decreases both apertures by the same amount. The position of the diaphragm, at which the photometer is balanced, and hence the area of the exposure aperture, will be related functionally to the level of brightneses of the scene being photographed. With the shutter speed properly selected, film of a given speed can be properly exposed over a wide range of levels of scene brightness.

When a camera of the type described is to be portable, the light source of known and fixed intensity usually takes the form of a battery operated lamp so that it is essential to minimize battery drain. One approach is to rely on the camera user to remember to switch off the lamp as soon as photometric balance has been achieved. However, an approach that would automatically switch off the lamp when the user is satisfied that photometric balance has been achieved would obviously decrease the frequency of battery replacement, and this constitutes the primary object of the present invention.

The primary object is achieved by providing on the camera, control means in the form of a combined aperture control and shutter actuator and which has a first mode of manual operation by which photometric balance is achieved (aperture control) and a second mode of manual operation, different and independent from the first mode, by which exposure is effected (shutter actuated). The control means is constructed and arranged so that operation in its first mode closes a switch controlling the application of the battery to the lamp. As soon as the photographer is satisfied with the degree of photometric balance achieved, and directs his attention to details which are an immediate prelude to tripping the shutter mechanism, operation of the control means in its first mode ceases as the photographer prepares to operate the control means in its second mode. Cessation of operation in the first mode serves to open the switch and extinguish the lamp.

In the preferred form of the invention, the control means is constituted by a single control knob rotatably and axially slidable on the camera housing. Rotation of the knob (the first mode of operation) adjusts the diaphragm to achieve photometric balance synchronously with establishment of the correct exposure aperture for the fixed speed shutter; and predetermined axial movement of the knob (second mode of operation) causes the shutter to be tripped. Adjustment of the diaphragm requires a predetermined torque to be applied to the knob; and in order to develop this torque, the user must exert with his fingers on the knob, a normal force whose magnitude depends upon the coefficient of friction between the knob and fingers. By making the knob resiliently deflectable in a radial direction, the normal force necessary to develop the required torque compresses the knob slightly. The slight radial movement serves to impart a slight axial movement to the knob that is less than the movement necessary to effect tripping of the shutter, but sufficient to close the contacts of the switch conrolling illumination of the lamp. With this construction, the battery is applied to the lamp essentially only during the time that it is needed, since as soon as the user releases the knob in preparation for moving it axially, the switch is opened.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of hte invention, reference should be had to the following detailed description taken in connection with the accompanying drawings wherein:

FIGURE 1 is a schematic of a camera of the type incorporating a comparison photometer capable of synchronously changing the exposure and photometer apertures, and including a synchronized flashbulb attachment;

FIG. 2 is a rear view of the front housing of the camera showing the diaphragm means by which the exposure and photometer apertures can be changed synchronously;

FIG. 3 is a sectional view taken along the line 3—3 of FIG. 2 and showing details of the dual mode control means by which the diaphragm means may be adjusted or the shutter tripped, the camera shutter being shown in place for convenience in describing the operation of the invention;

FIG. 4 is an enlarged view of the control means as shown in FIG. 2 except that the various parts are shown in section for illustrating the slight axial movement of the knob that occurs in response to its rotation by an operator (first mode operation of the control means);

FIG. 5 is a rear view of the front housing of the camera showing the shutter attached to a mounting plate which is broken away for clarity, the diaphragm means not being shown in this figure;

FIG. 6 is similar to FIG. 4 except that the second mode of operation of the control means is shown;

FIG. 7 is a top view of the front housing of the camera taken along the line 7—7 of FIG. 2 for the purpose of illustrating the index arrangement by which proper exposure can be obtained under flash conditions;

FIG. 8 is a section taken along the line 8—8 of FIG. 2 showing part of the index means of FIG. 7; and FIGS. 9 and 10 are sectional views of the knob taken along the lines 9—9 and 10—10 respectively of FIGS. 3 and 4 respectively for the purpose of showing the manner in which radial deformation of the segmented knob can take place.

Referring now to FIGURE 1, reference numeral 10 designates a camera system into which the present invention is incorporated. System 10 includes diaphragm means 11 having an exposure aperture aligned with fixed-speed shutter 12 and a photometer aperture aligned with photometer 13 such that light from scene 14 being photographed on film 15 is applied to both the shutter and the photometer. The observer at 16, viewing light from the scene and from standard lamp 17 in a common field, operates aperture control means 18 which, as will be described in detail below, causes the exposure and photometer apertures to either decrease or increase synchronously by the same amount, until photometric balance is achieved. Photometer 13 can be conventional in design, or can take the form disclosed in applicant's copending application Ser. No. 359,116, filed Apr. 13, 1964. Achieving photometric balance thus establishes the exposure aperture area with which, in cooperation with the fixed speed shutter, correct exposure of the scene will be effected. With this done, observer 16 operates shutter actuator 19 which trips the shutter and causes exposure of film 15.

In the preferred form of the invention, diaphragm means 11 and fixed speed shutter 12 are both mounted on housing 20 (see FIG. 2) which defines the front portion of the camera. Accordingly, housing 20 may include essentially flat plate 21 containing photometer aperture 22 and exposure aperture 23, and a peripheral flange 24 extending normal the plate 21 to define a recessed volume within which the diaphragm and shutter are contained. Diaphragm means 11 includes a pair of blades 25, 26, pivotally mounted together at bearing 27 on boss 28 that is integral with housing 20; and positionable at various relative angular positions by operation of control means which includes actuator means 29 and knob or member 30. Actuator means 29 includes cam means 31 and connection 32 between the cam means and blades 25 and 26, which can have various relative angular positions at which the edges of the blades overlie each other and are contoured to define variable photometer aperture 33 and variable exposure aperture 34 respectively aligned with apertures 22 and 23 in plate 21. As shown in the drawing, the axes of apertures 22 and 23 and the axis of bearing 27 lie in a common plane. Cam means 31 may take the form of a cylindrical cam 35 containing circumferential groove 36 that defines a plane inclined relative to the longitudinal axis 37 of the cam, the axial ends of which are reduced in diameter and rotatably mounted in spaced fixed bearing supports 38 and 39 integrally formed on housing 20. To facilitate assembly of the cam into the bearings, bearing 38 is preferably less than 360° so that insertion of the cam into the bearings is accomplished by first inserting the lower reduced portion of the cam laterally and longitudinally into bearing 39, and then aligning the axis of the cam with axis 37. Each of blades 25 and 26 have an extension, 40 and 41 respectively, projecting therefrom adjacent the region defining pivot 27 and terminating in free ends that lie adjacent to diametrically opposite surfaces of cam 35 and contain followers 42 operatively engaged in opposite sides of grooves 36. As a consequence of this construction, rotation of cam 35 serves to impart simultaneous but oppositely directed pivotal movement to blades 25 and 26. Thus, photometer aperture 22 and exposure aperture 23 are either increased or decreased simultaneously and by the same amount. It should also be noted that the ratio of the areas of the two apertures remains constant with the cam groove configuration indicated; and during each complete rotation of the cam, the absolute values of the areas change from a maximum to a minimum and back to maximum again. However, it is possible to limit rotation of the cam to 180°, and modify groove 36 such that the ratio of the two areas of the apertures change in response to rotation.

Actuator means 29 also includes square shaft 43 that is longitudinally slidable in square aperture 44 (see FIG. 3) in cam 35 and extends upwardly from the cam, through enlarged aperture 45 in web 46, and terminating in a free end 47 projecting through the knob means 30 normal to flange 24 at the top of housing 20. As shown best in FIG. 3 knob means 30 has a base 48 which has a cylindrical bearing portion 49 rotatably mounted in boss 50 that is integral with flange 24 and extends inwardly therefrom, and an enlarged cylindrical contact engaging portion 51 that extends from portion 49 toward cam 35 terminating in a flat shutter actuator portion 52. The shoulder, defined by the junction between portions 49 and 51 of the knob, limits the axial movement thereof when such shoulder engages boss 50, and constitutes stop means for limiting axial displacement of the knob in the direction indicated by arrow a. Base 48 is provided with square axial aperture 54 within which shaft 43 is axially slidable. Aperature 54 opens into enlarged circular recess 55 in the free end of cylindrical portion 49 that faces toward the exterior of the housing.

The free end of shaft 43 is constituted by circular rod 56 which is of a diameter greater than the diagonal dimension of shaft 43 and rigidly attached thereto to define a shoulder against which portion 51 of the knob is engageable. Spring contact arm 57 affixed to plate 21 is engaged by portion 51 of the knob and serves to bias the latter in the direction of arrow a and normally maintains the shoulder between portions 49 and 51 in resilient engagement with boss 50. The engagement of portion 51 on the knob with rod 56 on the shaft serves to resiliently maintain the latter in the terminal axial position shown in FIG. 3.

Portion 49 of the knob is provided with a plurality of individual axially extending cantilevered segments 58 that surround rod 56. Preferably, the segments are formed by properly slotting a cylindrical extension to portion 49, the outer surface of which defines coaxial surfaces (indicated at 59) adapted to be grasped between the fingers of the user as indicated in FIG. 4. Enlarged conical portion 60 at the free end 47 of the shaft is engaged by the free ends 61 of segments 58 when the knob is in the normal position shown in FIG. 3; and rod 56 is of such cross section relative to segments 58 as to define therewith an annular region 62 within which radial deflection of the segments can be accommodated. Preferably, the segments are tapered on their inner surfaces to define annular region 62'.

With the above-described construction, it is apparent that shaft 43 is mounted on the housing for both rotation and axial reciprocation, and that the knob is keyed to the shaft but is axially slidable thereon for axial movement relative to the housing as well as rotation thereon. Since the shaft is keyed to cam 35, the rotation of which is necessary to cause relative pivotal movement of blades 25 and 26 in opposite directions, it follows that the mass of the various parts as well as the friction therebetween, require the user to impart to knob 30 a predetermined amount of torque in order to rotate cam 35 and change the sizes of openings 33 and 34. Such torque is developed as the result of inwardly directed radial forces applied to opposite surfaces 59 of the knob when the user grasps the knob with his fingers as shown in FIG. 4 and tries to rotate the knob. The inwardly directed radial forces accompanied by rotation of the fingers generate tangentially to surfaces 59, a pair of oppositely directed couple-forces, the magnitudes of which are dependent upon the coefficient of friction between the knob and the fingers and the amount of radial force exerted on the knob by the user. Thus, on the average, there will be some minimum radial force which must be applied to the knob in order to overcome the resistance of the movable parts (the blades, cam, etc.) of the diaphragm means and effect a change in the aperture areas defined by the two diaphragm blades. If cantilevered segments 58 are elastic enough to radially deflect under the minimum radial load, as shown in FIG. 4, relative axial movement of knob 30 on shaft 43 will result due to the camming action of free ends 61 on the inverted conical portion 60 of the shaft.

To control this relative movement, snap ring 62 engaged in circumferential notch 63 of the shaft is provided such that the snap ring normally rests against web 46 and limits movement of the shaft in the direction of arrow *a*. Thus, when segments 58 are radially deflected into annular region 62', the knob moves axially into the housing on the shaft in the direction opposite to arrow *a* against the action of spring contact arm 57. (See FIG. 4.) This limited axial movement of the knob relative to the housing serves to cam spring contact arm 57 into electrical engagement with spring contact arm 64 which is normally separated from arm 57 when the knob is in its normal axial position relative to the housing as shown in FIG. 2. Contacts 57 and 64 are electrically insulated from each other and constitute the switch by which lamp 17 of the photometer is connected across photometer battery 65. The resilient nature of cantilevered segments 58 is such that, upon their release, they spring back to their normal position, and spring contact arm 57 is effective to return the knob to its normal position with portion 51 butting boss 50. This serves to disconnect the battery from lamp 17.

A suitable material for knob 30 having the requisite degree of resilience and ease of deformation is nylon, although other materials suitable for this purpose will be suggested to those skilled in the art once the operation of the disclosed device is appreciated. Since free end 47 of shaft 43 extends axially beyond knob 30, it provides access for applying an axial force to the knob that is independent of the torque developed to effect photometric balance. In other words, the control means which includes actuator means 29 and knob 30 has two modes of operation. In the mode just described, wherein rotation of the knob is accompanied by slight axial movement of the knob relative to the housing and serves to close the photometer switch and permit a photometric balance to be achieved, the actuator means and the knob perform the function of aperture control 18 previously described. In the mode to be described now, however, actuator means 29 and knob 30 cooperate to perform the function of shutter actuator 19. To better understand this function, however, the operation of shutter mechanism 70 shown best in FIG. 5, will be described briefly. Mechanism 70 includes shutter blind 71 pivotally mounted at 72 on shutter plate 73 which fits within flanges 24 and is fastened at each corner of the housing 20 to entirely enclose both the shutter mechanism and the diaphragm means and actuator. Blind 71 is provided with exposure aperture 74 oriented so that it is misaligned with exposure aperture 23 when in its normal position shown in solid lines in FIG. 5, but aligned with the exposure aperture when in the operative position shown by the broken lines. To impart pivotal movement to the blind and move the latter from its normal to its operative position, the blind is provided with extension 75 which contains a pin 76 whose axis is parallel to the axis of pivot 72 and which extends through arcuate slot 77 in plate 73 and serves to aid in properly positioning blind 71. Pivotally attached to pin 76 is yoke 78 which includes a slotted outturned flange 79 that is engaged around shaft 43 as shown best in FIG. 3. Flange 79 is engageable by portion 52 of the knob when conical portion 60 at end 47 of the shaft is depressed as shown in FIG. 6. Thus, axial movement of the knob from its normal position shown in FIG. 3 to its operative position shown in FIG. 6 causes blind 71 to pivot from its normal position shown in solid lines in FIG. 5 to the operative position shown in broken lines in this figure against the action of a torsion spring (not shown) interposed between the blind and plate 73 and preferably mounted on pivot 72 such that the blind is urged toward its normal position (counterclockwise as seen in FIG. 5). It should be noted that the limited axial movement of the knob in response to its rotation is not sufficient to effect movement of the blind as is indicated in FIG. 4.

Shutter blade 80 is pivotally connected at 81 to blind 71 and is made as light as possible, consistent with its intended purpose, by shaping the blade as indicated. To this end, the blade has a generally arcuate portion 82 which is provided with slotted aperture 83, the purpose of which is to sweep past exposure aperture 23 when aperture 74 is aligned therewith and so effect exposure. Blade 80 is also provided with a generally radially extending arm 84 projecting beyond blind 71 and into engagement with stop 85 rigidly attached to plate 73 on the side thereof facing the shutter blade.

With the above-described construction the initial pivotal movement of blind 71 in response to the operation of actuator means 29 in the shutter actuation mode (depression of knob 30 and rod 43) causes shutter blade 80 to pivot about pin 81 as the latter is carried in an arcuate path about pivot 72. However, arm 84 remains engaged with stop 85 until the instant blind 71 bottoms against flange 24 to define its operative position with aperture 74 aligned with exposure aperture 23. In this position, the outermost tip of arm 84 clears stop 85, and a spring (not shown) acting between the shutter and the blind drives the shutter from its normal position shown in solid lines in FIG. 5 to its final position shown in broken lines in this figure and causes aperture 83 to sweep past aligned apertures 23 and 74. When the operator releases knob 30, the spring means associated with the blind returns the shaft to its normal position; assisted at the very end by the action of spring contact arm 57 on knob 30. Blind 71 is thus returned to its normal position, carrying blade 80 with it due to flange 86 on the blind which engages the blade. In returning the blade to its normal position, arm 84 rides up and over stop 85 and snaps back into place behind the stop, and the device is ready to effect another exposure.

In order to provide type M flash synchronism, switch 87 is pivotally mounted at 87' on plate 73. Switch 87, which is electrically conductive, constitutes one of the flash contacts and includes arm 88 engageable by the tip of arm 84 after the latter clears stop 85 and begins its initial movement. This initial movement, which occurs just prior to initiation of exposure, pivots switch 87 from its normal position shown in solid lines in FIG. 5 to its operative position shown in broken lines causing arm 88 to come into sliding engagement with flash contact 89 mounted on plate 73 but insulated therefrom. Thus, the flash contacts 88 and 89 engage just prior to initiation of exposure and serve to discharge capacitor 90 into flash bulb 91 as shown in FIGURE 1, permitting maximum flash intensity to occur at maximum shutter opening.

Switch 87 is also provided with arm 92, making an angle of about 90° with arm 88, and projecting into the path of movement of arm 84 on the shutter blade when the latter is returned to its normal position by blind 71. The engagement of arm 92 by arm 84 serves to return the switch to its normal position at the same time the blind is returned.

In a situation where the photographer wishes to utilize flash illumination, the photometer is of course not used. Since the shutter speed is fixed, proper exposure is achieved by functionally relating the area of exposure aperture 34 of the diaphragm to the distance of the subject from the flash bulb. To this end, the camera is provided with index means 93 (see FIG. 7) observable by the user, and movable relative to stationary index means 94 on the camera in response to operation of the control means in the first-described mode (rotation of knob 30). Index means 94 is calibrated in terms of subject distance that will properly relate the area of the exposure aperture in the diaphragm to the distance from the camera to the subject when it is illuminated by the camera flash. In the preferred form, index means 93 is constituted by an extension 95 to diaphragm blade 25 (see FIG. 8) which projects upwardly therefrom and through slot 96 in the top flange 24 of the housing. In this manner, the exposure value of the shutter mechanism (in this case, the diaphragm area in a fixed speed shutter) can be set at the option of the user, by operation of the control means in its first mode, based on either visual comparison of the brightness of the subject with a standard light source, or on the distance of the subject to the camera.

The above-described construction makes optimum use of photometer battery 65 because current is drawn from the latter essentially only during the time required by the user to obtain photometric balance. Actually, as can be seen by a comparison of FIG. 4 with FIG. 6, contact arms 57 and 64 are also caused to engage when shaft 43 is depressed to trip the shutter mechanism. However, the time interval between the depression and release of the end 47 of the shaft is several orders of magnitude smaller than the time interval which, on the average, will be required by the user to achieve photometric balance. For example, human reaction time in depressing and releasing the shaft may require about ½ second, while the average photographer will probably require 50 to 100 times as long to properly balance the photometer. Thus, for all practical purposes, it may be said that the photometer battery is applied to the lamp only during balancing of the photometer.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. In a comparison photometer, the combination of:
  (a) an electrical circuit that includes a lamp and a switch closable to cause said lamp to be illuminated;
  (b) a first light source whose brightness is functionally dependent upon the intensity of light from said lamp;
  (c) a second light source;
  (d) a photometer head for bringing both light sources into a common field so that the relative brightness of said sources can be compared;
  (e) first means manually operable to change the relative brightness between said sources; and
  (f) second means operatively connected to said first means and responsive to manual operation of said first means for automatically closing said switch.
2. Apparatus in accordance with claim 1 wherein said second means is constructed and arranged so that said switch is closed automatically during manual operation of said first means and is opened automatically at the termination of such manual operation.
3. Apparatus in accordance with claim 2 wherein said first means includes:
  (a) a rotatable actuator for changing the relative brightness of said sources in response to rotation of said actuator, and requiring the application of a predetermined torque to effect rotation; and
  (b) knob means for applying torque to said actuator;
  (c) said knob means being constructed and arranged so that the manual application to said knob means of at least said predetermined torque causes said switch to close.
4. Apparatus in accordance with claim 3 wherein said knob means includes:
  (a) a shaft keyed to said actuator so that rotation of said shaft imparts rotation to said actuator; and
  (b) a knob mounted on said shaft and constructed and arranged so that the manual application to said knob of at least said predetermined torque causes relative motion to occur between said shaft and said knob, such relative motion serving to close said switch.
5. Apparatus in accordance with claim 4 wherein:
  (a) said knob is axially slidable on said shaft and has an operative axial position at which it causes said switch to be closed;
  (b) a spring urges said knob away from its operative axial position; and
  (c) said knob is also resiliently deformable on said shaft when torque is applied manually;
  (d) the deformation of said knob in response to the manual application of at least said predetermined torque causing said knob to slide axially to its operative position against the action of said spring.
6. In a comparison photometer, the combination of:
  (a) an electrical circuit that includes a lamp and a switch closable to cause said lamp to be illuminated;
  (b) a first light source whose brightness is functionally dependent upon the intensity of light from said lamp;
  (c) a second light source;
  (d) a photometer head for bringing both light sources into a common field so that the relative brightness of said sources can be compared;
  (e) a rotatable actuator for changing the relative brightness between said sources in response to manual rotation of said actuator; and
  (f) means coacting with said actuator permitting manual rotation of said actuator only when said switch is closed.
7. In a camera, the combination of:
  (a) a comparison photometer that includes a first source whose brightness is functionally related to the brightness of the scene being photographed, a second source whose brightness is functionally related to the brightness of a lamp, and means for visually comparing said sources;
  (b) shutter means that includes a trippable shutter for effecting exposure of said scene and adjustable exposure value control means for controlling the amount of light passing through said shutter when it is tripped;
  (c) actuator means operable to synchronously change the relative brightness of said sources and adjust the exposure value control means of said shutter means; and
  (d) singular means manually operable in a first mode for operating said actuator means and manually operable in a second mode for tripping said shutter.
8. A camera in accordance with claim 7 provided with a flash attachment and flash synchronizing contacts so that flash illumination of the subject being photographed is optional with the user, wherein said actuator means includes:
  (a) index means observable by said user and movable relative to stationary index means on said camera in response to operation of said actuator means;
  (b) one of said index means being calibrated in terms of subject distance functionally related to the exposure value of said shutter means when a subject is under flash illumination whereby the exposure value of said shutter means can be set at the option of the user, by operation of said singular means in said first mode, based on either visual comparison of said two sources or the distance of the subject from the camera.
9. Apparatus in accordance with claim 1 wherein the lamp of said comparison photometer is in an electrical circuit that includes a switch closable to cause said lamp to be illuminated, said switch and said singular means being so constructed and arranged that said switch is closed by the manual operation of said singular means in said first mode.
10. Apparatus in accordance with claim 9 wherein said singular means includes a knob mounted on said camera for rotation about an axis and reciprocation thereon between two terminal axial positions, rotation and reciprocation of said knob constituting the two modes of operation of said singular means.

11. Apparatus in accordance with claim 10 wherein manual rotation of said knob when the latter is in a one terminal axial position constitutes said first mode of operation and is accompanied by reciprocation of said knob to an extent insignificant in comparison to reciprocation between said terminal axial positions that constitutes said second mode of operation, the reciprocation of said knob that accompanies operation thereof in said first mode serving to close said switch.

12. Apparatus in accordance with claim 11 wherein one contact of said switch is constituted by a spring which resiliently urges said knob into said one terminal position.

13. Apparatus for causing a switch to be actuated during rotation of an actuating member that requires a predetermined torque to effect rotation, comprising:
  (a) a shaft coaxial with the axis of rotation of said member and keyed at one end to said member so that rotation of said shaft imparts rotation to said member;
  (b) a knob mounted on the other end of said shaft so that relative axial movement can take place but rotation of said knob imparts rotation to said shaft;
  (c) a spring for resiliently holding said knob and shaft in a first relative axial position;
  (d) said knob having portions resiliently deformable in a direction normal to said axis when a torque is developed thereon by attempting to manually rotate said knob;
  (e) said knob and shaft having cam surfaces in cooperative engagement when said knob and shaft have said first relative axial position and being constructed and arranged so as to cause relative axial movement upon deformation of said resiliently deformable portions of said knob against the action of said spring whereby development of said predetermined torque on said knob causes said knob and shaft to have a second relative axial position; and
  (f) the second relative axial position of said knob and shaft causing said switch to be actuated and said spring being effective to move said knob and shaft out of its second relative position and terminate switch actuation when the torque developed on the knob is insufficient to rotate said knob.

14. Apparatus in accordance with claim 13 wherein said spring constitutes one contact arm of said switch.

15. Apparatus in accordance with claim 13 wherein said shaft is constrained against axial movement at least in one direction.

16. In combination with a housing:
  (a) a shaft mounted on said housing for rotation and axial reciprocation;
  (b) means to limit axial displacement of said shaft in one direction to a first terminal position;
  (c) a knob keyed to said shaft but axially slidable thereon and having stop means for limiting relative axial displacement in said one direction;
  (d) a spring cooperable with said knob for urging the latter in said one direction and normally effective to maintain said shaft in said first terminal position so that said knob occupies a first relative axial position on said housing; and
  (e) means associated with said knob and shaft for causing said knob to move axially on said shaft relative to said housing out of said first position against the action of said spring when said knob in manually rotated.

17. Apparatus in accordance with claim 16 wherein:
  (a) said last-named means includes:
    (1) a plurality of axially extending cantilevered segments on said knob surrounding said shaft and defining a coaxial surface adapted to be grasped when manual rotation of said knob is effected;
    (2) a conical portion on said shaft engaged by the free ends of said segments when said knob is in said first relative axial position, said shaft being of such cross-section relative to said segments as to define therewith an annual region to accommodate radial deflection of said segments;
  (b) the torque required to effect rotation of said shaft requires the application to said segments of a predetermined radial force which moves the free ends of said segments radially into cooperative movement relative to said conical portion for causing said knob to be moved, relative to both said housing and said shaft, from its first relative axial position through a predetermined displacement against the action of said spring.

18. Apparatus in accordance with claim 17 wherein a switch is actuated whenever said knob moves at least through said predetermined displacement.

19. Apparatus in accordance with claim 17 wherein a portion of said shaft extends axially beyond said knob to provide access for applying an independent axial force to said shaft.

References Cited by the Examiner

UNITED STATES PATENTS

| | | | |
|---|---|---|---|
| 1,762,048 | 6/1930 | Camp | 95—10 |
| 2,112,701 | 3/1938 | Leitz | 95—10 |
| 2,341,837 | 2/1944 | Andrews | 200—4 |
| 2,849,893 | 9/1958 | Wijchman | 74—471 X |
| 3,072,028 | 1/1963 | Lange | 95—10 |
| 3,121,379 | 2/1964 | Macomber et al. | 95—11.5 X |

NORTON ANSHER, *Primary Examiner.*

J. F. PETERS, JR., *Assistant Examiner.*